United States Patent Office 3,388,184
Patented June 11, 1968

3,388,184
DEHYDROGENATION OF PARAFFIN HYDROCARBON OVER Pt CATALYST TREATED WITH ALUMINUM MONOFLUORIDE VAPOR
Norman A. Fishel, Lansing, Mich., assignor to Universal Oil Products Company, Des Plaines, Ill., a corporation of Delaware
No Drawing. Filed Oct. 10, 1966, Ser. No. 585,237
10 Claims. (Cl. 260—683.3)

ABSTRACT OF THE DISCLOSURE $C_4$–$C_6$ and cyclohexane were dehydrogenated over Pt -$Al_2O_3$ pellets upon which AlF had been volatilized at 650° C. from mixture of Al metal and $AlF_3$.

This invention relates to a conversion process for the dehydrogenation of a paraffinic hydrocarbon into more useful compounds. More specifically, this invention is concerned with a conversion process for the dehydrogenation of a paraffinic hydrocarbon utilizing a novel catalyst comprising a refractory inorganic oxide containing at least one metal from Group VIII of the Periodic Table chemically combined with a metal subfluoride vapor.

It is an object of this invention to provide a process for the dehydrogenation of paraffinic hydrocarbons utilizing a novel dehydrogenation catalyst.

A specific object of this invention is provide a novel method and a novel catalyst for dehydrogenating paraffinic hydrocarbons to provide the desired dehydrogenated product in high yields without the inducing of other decomposition reactions.

One embodiment of the invention relates to a conversion process which comprises dehydrogenating a paraffinic hydrocarbon at a temperature in the range of from about 0° to about 425° C. and a pressure in the range of from about atmospheric to about 200 atmospheres in contact with a catalyst comprising a refractory inorganic oxide containing at least one metal from Group VIII of the Periodic Table chemically combined with a metal subfluoride vapor.

Other objects and embodiments referring to alternative paraffinic hydrocarbons and to alternative catalytic compositions of matter will be found in the following further detailed description of the invention.

The process of my invention is especially applicable to the dehydrogenation of paraffinic hydrocarbons including the cycloparaffins. Suitable paraffinic hydrocarbons thus would include propane, n-butane, isobutane, n-pentane, isopentane and higher molecular weight paraffinic hydrocarbons and mixtures thereof. It is not intended to limit this invention to those enumerated paraffinic hydrocarbons set out above as it is contemplated that paraffinic hydrocarbons containing up to about 20 carbons atoms per molecule may be dehydrogenated according to the process of the present invention.

As hereinbefore set forth, the invention is concerned with a conversion process for the dehydrogenation of paraffinic hydrocarbons, said process being effected in the presence of a catalyst which possesses a high degree of hydrocarbon conversion activity and is particularly effective as a dehydrogenation catalyst for the paraffinic hydrocarbons hereinabove set forth. The catalyst comprises a refractory inorganic oxide containing at least one metal from Group VIII of the Periodic Table chemically combined with a metal subfluoride vapor. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition of the aforementioned gamma-, eta- and theta-aluminas which may be utilized as solid supports, it is also contemplated that other refractory oxides, containing at least one metal from Group VIII of the Periodic Table, such as silica, zirconia, magnesia, thoria, etc., and combinations of refractory oxides containing at least one metal from Group VIII of the Periodic Table such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide containing at least one metal from Group VIII of the Periodic Table that is combined with a metal subfluoride vapor to effect chemical combination of the refractory inorganic oxide with said metal subfluoride vapor.

Typical metals from Group VIII of the Periodic Table for use in the present invention include platinum, palladium, ruthenium, rhodium, osmium and iridium and mixtures thereof. Platinum and palladium are particularly preferred. The Group VIII component of my novel catalyst for use in the present invention will normally be utilized in an amount of from about 0.01 percent to about 2 percent by weight.

Particularly preferred metal subfluorides include the aluminum subfluorides including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalysts inasmuch as chemical combination of the refractory inorganic oxide containing at least one metal from Group VIII of the Periodic Table with the metal subfluoride vapor is accomplished as hereinafter described.

The catalyst of the present invention comprises a metal subfluoride vapor chemically combined with the refractory inorganic oxide containing at least one metal from Group VIII of the Periodic Table so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide containing at least one metal from Group VIII of the Periodic Table at temperatures in the range of 650° C. to about 1200° C. and at a pressure of from about subatmospheric to about 7 atmospheres. The formation of the metal subfluoride vapor, and especially the formation of anhydrous aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 800° C. The refractory inorganic oxide containing at least one metal from Group VIII of the Periodic Table which is then chemically combined with the anhydrous aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the refractory inorganic oxide containing at least one metal from Group VIII of the Periodic Table catalyst support and then heating in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the paraffinic hydrocarbon is continuously charged to a reaction zone containing a fixed bed of the desired catalyst, said zone being maintained at the proper operating conditions of temperature and pressure, that is, a temperature in the range of from about 0° to about 425° C. or more, and preferably from 50° to about 400° C., and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 3000 or more. The reaction zone may comprise an unpacked vessel or coil or may be lined with an adsorbent packing material. The charge passes through the catalyst bed in either an upward or downward flow and the dehydrogenated product is continuously withdrawn, separated from the reactor effluent, and recovered, while any unreacted starting materials may be recycled to form a portion of the feed stock. It is also contemplated within the scope of this invention that reaction gases such as helium, hydrogen, nitrogen, argon, etc., may also be charged to the reaction zone if desired. Another continuous type operation comprises the moving bed type in which the paraffinic hydrocarbon and the catalyst bed move either concurrently or countercurrently to each other while passing through said reaction zone.

Still another type of operation which may be used is the batch type operation in which a quantity of the paraffinic hydrocarbon and the catalyst are placed in an appropriate apparatus such as, for example, a rotating or stirred autoclave. The apparatus is then heated to the desired temperature and maintain thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

Example I

A quartz vessel with provisions for connection to a vacuum system was filled with a mixture of about 50 grams of $\frac{1}{16}$ inch alumina spheres containing 0.75 percent (by weight) platinum and about 10 grams of $\frac{1}{8}$ inch pellets comprising about 20% aluminum metal and about 80% aluminum trifluoride by weight. The contents of the vessel are outgassed at a pressure of less than $10^{-4}$ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.1 weight percent was achieved. This catalyst was designated as catalyst "A."

Example II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Anhydrous aluminum monofluoride was then produced. A catalyst base in the form of $\frac{1}{16}$ inch alumina spheres containing 0.375 percent (by weight) platinum was then placed in the downstream helium flow and the aluminum monofluoride was chemically combined with the alumina base at a temperature in excess of 650° C.

The catalyst produced by this vapor deposition and chemical combination of the aluminum monofluoride with the alumina had a flouoride level of about 3.2 percent by weight of fluoride chemically combined therewith. This catalyst was designated as catalyst "B."

Example III

The catalyst designated as catalyst "A" prepared according to Example I above is utilized in a dehydrogenation reaction, the finished catalyst being placed in an appropriate continuous dehydrogenation apparatus. In the experiment, normal butane is charged to the dehydrogenation zone. The reactor is maintained at about 30 p.s.i.g. and 140° C. Substantial conversion of the normal butane to $C_4$ olefins is obtained as is evidenced by gas-liquid chromatography.

Example IV

A second portion of the catalyst prepared according to Example I and designated as catalyst "A" is again utilized in an appropriate continuous dehydrogenation apparatus. In the experiment, a fresh batch of the finished catalyst is placed in the reaction zone and normal pentane is charged to said reaction zone. The reactor is maintained at about 80 p.s.i.g. and about 200° C. Substantial conversion of the normal pentane to $C_5$ olefins is obtained as is evidenced by gas-liquid chromatography.

Example V

The catalyst prepared according to Example II and designated as catalyst "B" was utilized in an appropriate continuous dehydrogenation apparatus to determine the dehydrogenation activity of said catalyst. In the experiment, the catalyst was placed in the dehydrogenation reaction zone and normal hexane was charged to said reaction zone. The reactor was mantained at about 30 p.s.i.g. and a temperature of about 150° C. Gas-liquid chromatographic analyses of the product stream indicate that substantial conversion to hexene-2 was obtained.

Example VI

The catalyst prepared according to Example I and designated as catalyst "A" was utilized in the dehydrogenation apparatus. In the experiment, a fresh batch of finished catalyst was placed in the dehydrogenation reaction zone and cyclohexane was charged thereto. The reactor was maintained at about 150 p.s.i.g. and about 245° C. Substantial conversion of the cyclohexane to cyclohexene was obtained as was evidenced by gas-liquid chromatography.

I claim as my invention:

1. A conversion process which comprises dehydrogenating a paraffinic hydrocarbon at a temperature of from about 0° to about 425° C. and a pressure in the range of from about atmospheric to about 200 atmospheres in contact with a catalyst comprising a refractory inorganic oxide containing at least one metal from Group VIII of the Periodic Table chemically combined with a metal subfluoride vapor.

2. The process of claim 1 further characterized in that said metal subfluoride is aluminum monofluoride.

3. The process of claim 2 further characterized in that said refractory inorganic oxide comprises alumina.

4. The process of claim 2 further characterized in that said refractory inorganic oxide comprises silica-alumina.

5. The process of claim 2 further characterized in that said refractory inorganic oxide containing at least one Group VIII metal contains platinum.

6. The process of claim 5 further characterized in that said paraffinic hydrocarbon is isobutane.

7. The process of claim 5 further characterized in that said paraffinic hydrocarbon is normal butane.

8. The process of claim 5 further characterized in that said paraffinic hydrocarbon is normal pentane.

9. The process of claim 5 further characterized in that said paraffinic hydrocarbon is normal hexane.

10. The process of claim 5 further characterized in that said paraffinic hydrocarbon is cyclohexane.

References Cited

UNITED STATES PATENTS

| 3,126,426 | 3/1964 | Turnquest et al. | 260—683.3 |
| 3,315,008 | 4/1967 | Abell et al. | 260—683.3 |
| 3,332,886 | 7/1967 | Wilson | 252—442 |
| 3,338,843 | 8/1967 | Goble et al. | 252—442 |

DELBERT E. GANTZ, *Primary Examiner.*

C. E. SCHMITKONS, *Assistant Examiner.*